(12) United States Patent
Bessette

(10) Patent No.: US 8,887,782 B2
(45) Date of Patent: Nov. 18, 2014

(54) MEMBRANE APPLYING APPARATUS

(71) Applicant: Robert Bessette, Drummondville (CA)

(72) Inventor: Robert Bessette, Drummondville (CA)

( * ) Notice: Subject to any disclaimer, the term of this patent is extended or adjusted under 35 U.S.C. 154(b) by 0 days.

(21) Appl. No.: 13/784,131

(22) Filed: Mar. 4, 2013

(65) Prior Publication Data

US 2013/0228287 A1 Sep. 5, 2013

Related U.S. Application Data

(60) Provisional application No. 61/606,058, filed on Mar. 2, 2012.

(51) Int. Cl.
*B32B 37/00* (2006.01)
*B29C 63/00* (2006.01)
*E04D 15/06* (2006.01)
*B29C 63/02* (2006.01)
*E04D 15/04* (2006.01)

(52) U.S. Cl.
CPC ............ *B29C 63/0065* (2013.01); *E04D 15/06* (2013.01); *B29C 63/024* (2013.01); *E04D 15/04* (2013.01)
USPC ............................. 156/497; 156/499; 156/577

(58) Field of Classification Search
USPC ........... 156/82, 497, 499, 555, 574, 577, 579, 156/580, 582
See application file for complete search history.

(56) References Cited

U.S. PATENT DOCUMENTS

| | | | | |
|---|---|---|---|---|
| 4,242,173 A * | 12/1980 | Stenemann | ................... | 156/523 |
| 4,313,780 A * | 2/1982 | Ford, Jr. | ........................ | 156/523 |
| 4,725,328 A * | 2/1988 | Arnold | ...................... | 156/380.9 |
| 6,484,781 B2 * | 11/2002 | Weaver | ......................... | 156/577 |
| 6,588,475 B1 * | 7/2003 | Simon et al. | ................... | 156/359 |
| 7,347,244 B2 * | 3/2008 | Vaillancourt | ................. | 156/497 |

* cited by examiner

*Primary Examiner* — James Sells
(74) *Attorney, Agent, or Firm* — Brouillette & Partners; Robert Brouillette

(57) ABSTRACT

A membrane applying apparatus comprises a wheeled frame adapted to ride on a surface to be covered with the membrane. The rear end of the wheeled frame is generally configured to support a roll of membrane. The apparatus also comprises a roller support frame pivotally mounted to the wheeled frame at the rear end thereof. The roller support frame pivotally supports an idler roller and a pressing roller for respectively guiding and pressing the membrane as the membrane is unrolled during its application. The roller support frame is pivotable between an operative position in which the idler roller and pressing roller respectively guides and presses the membrane, and an inoperative position. In the inoperative position, the roller support frame is pivoted substantially upwardly, thereby providing access to the rear end of the wheeled frame to allow the installation or removal of the roll of membrane.

20 Claims, 12 Drawing Sheets

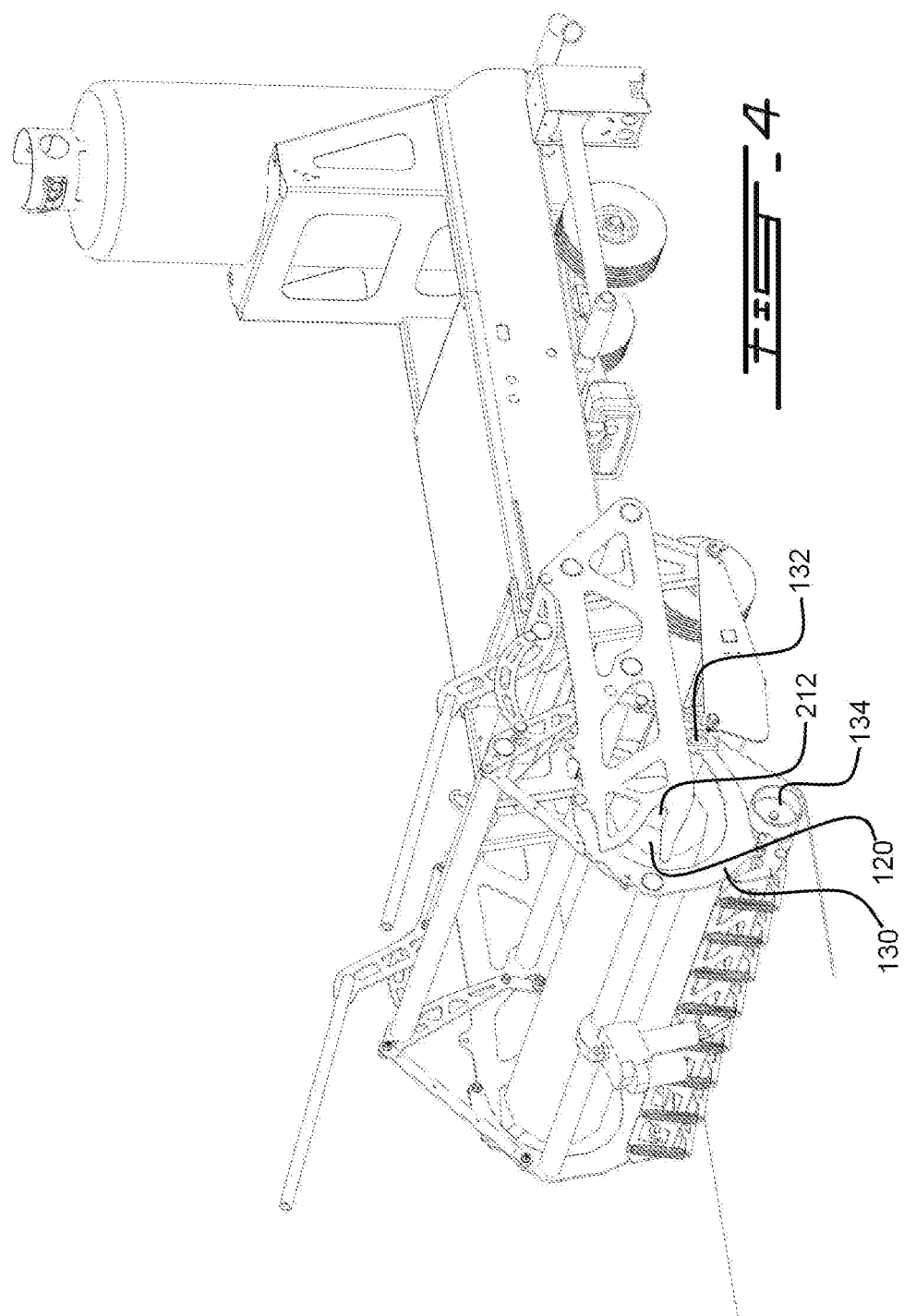

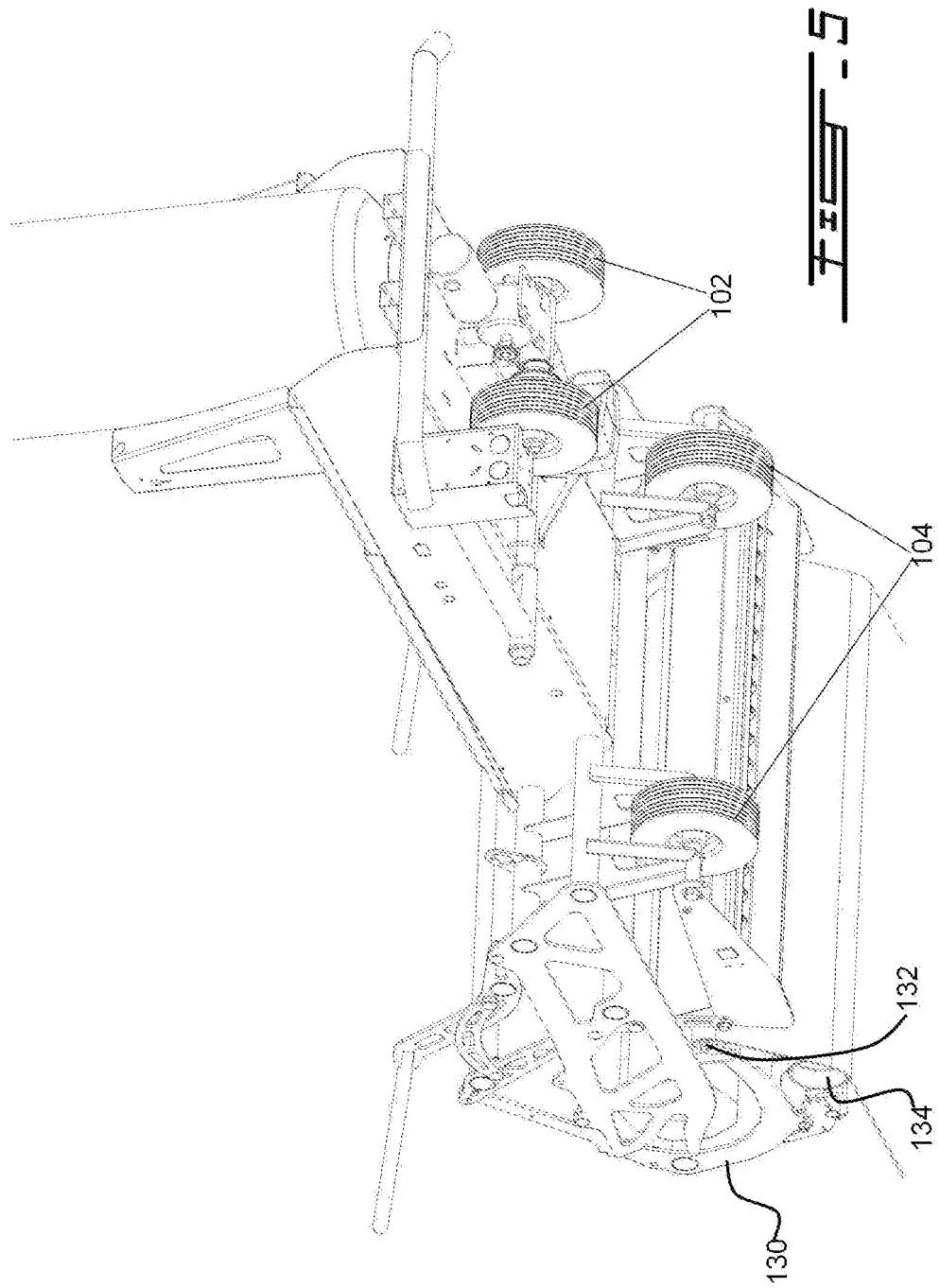

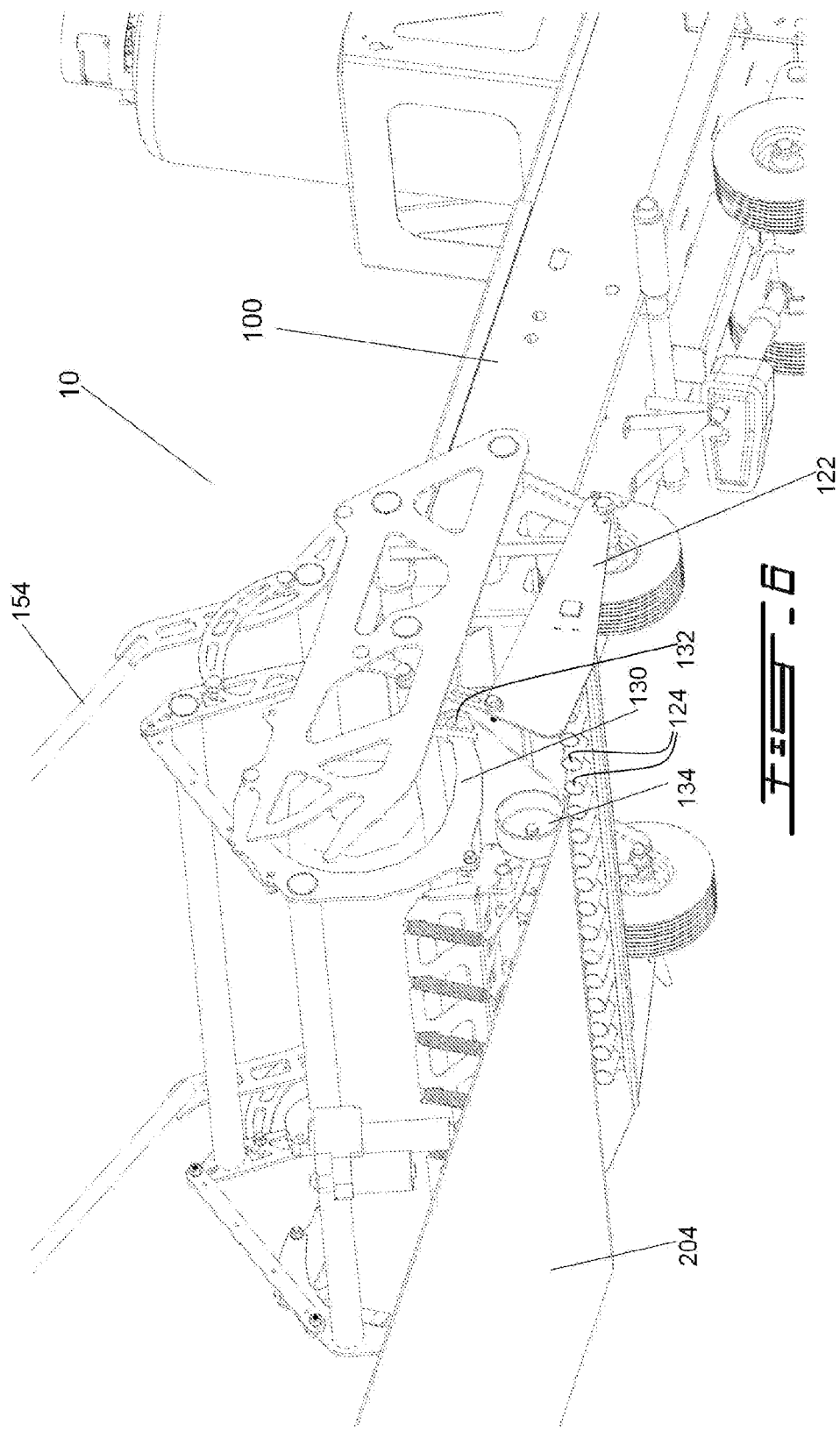

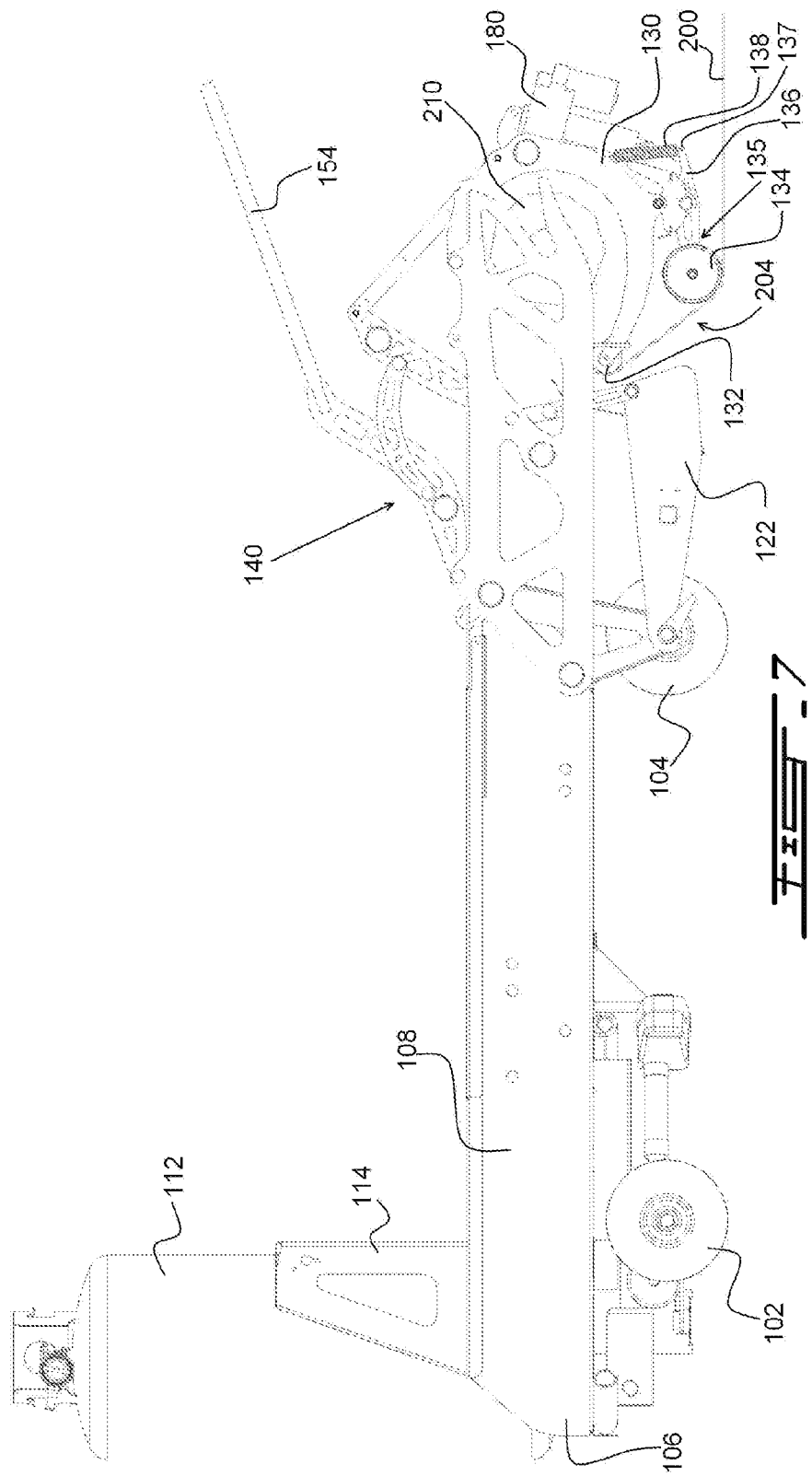

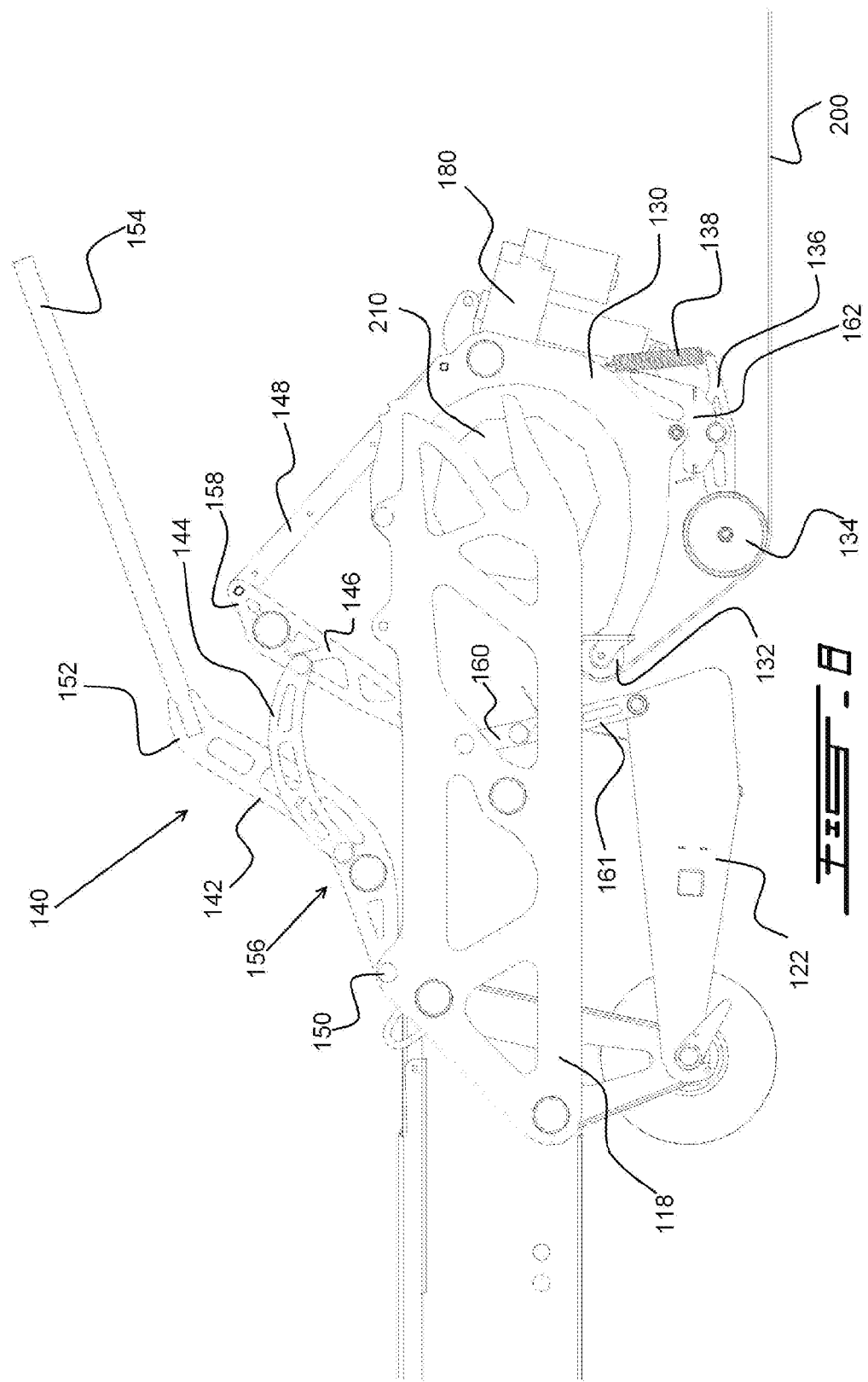

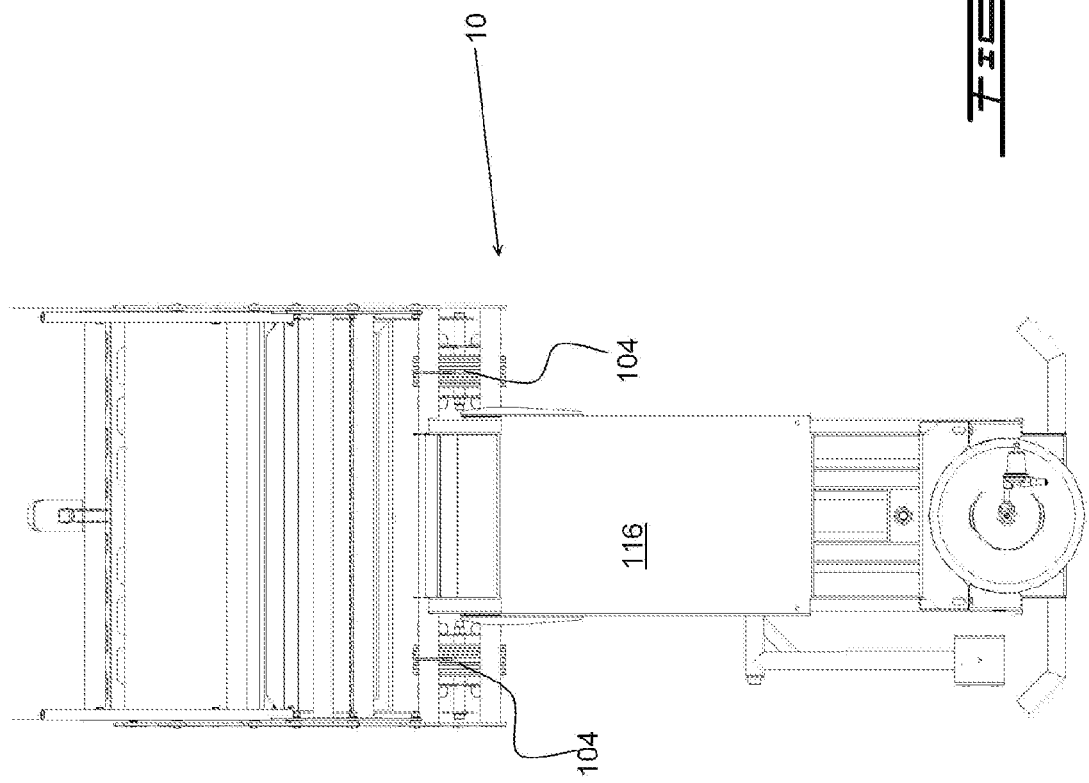

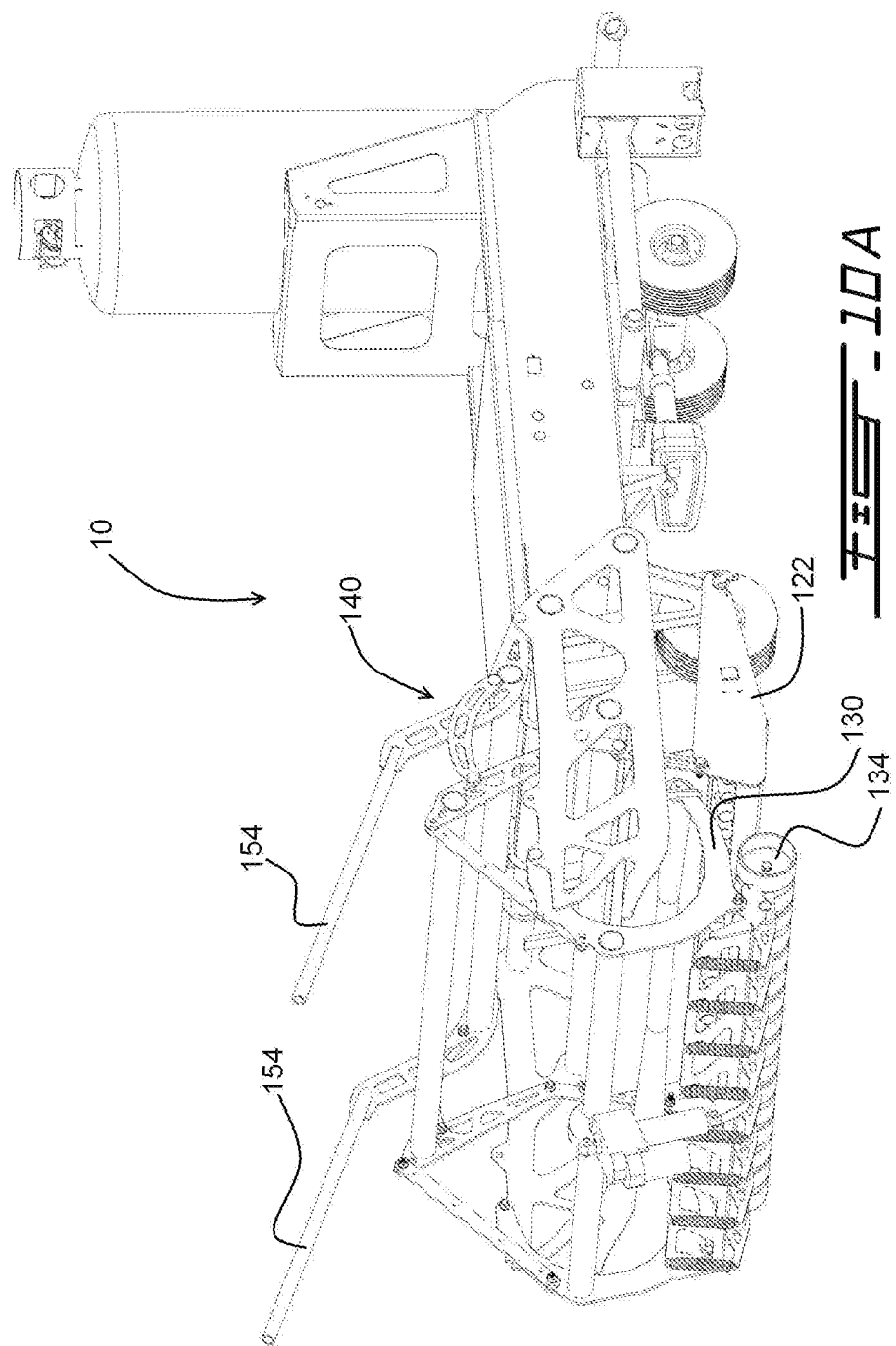

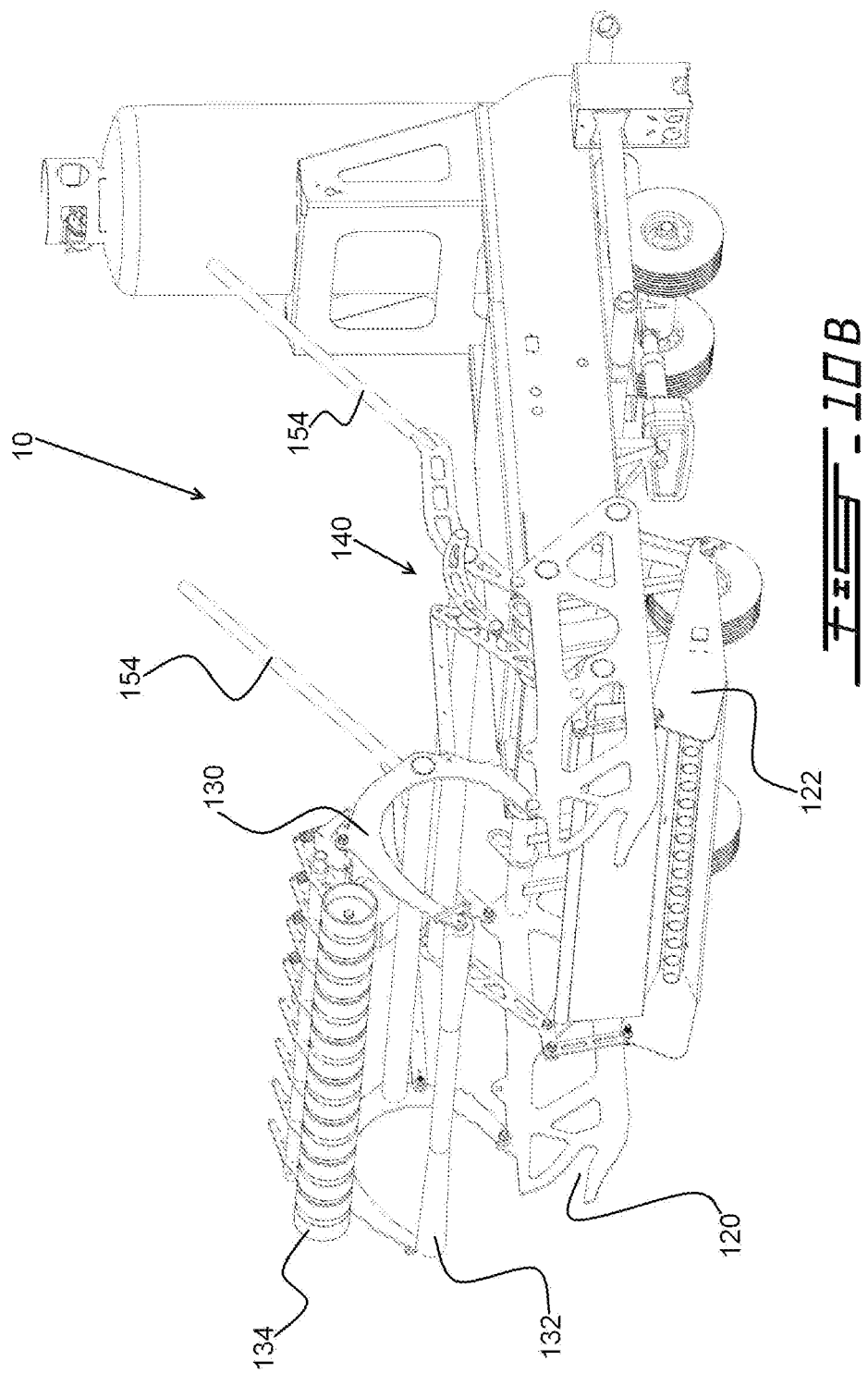

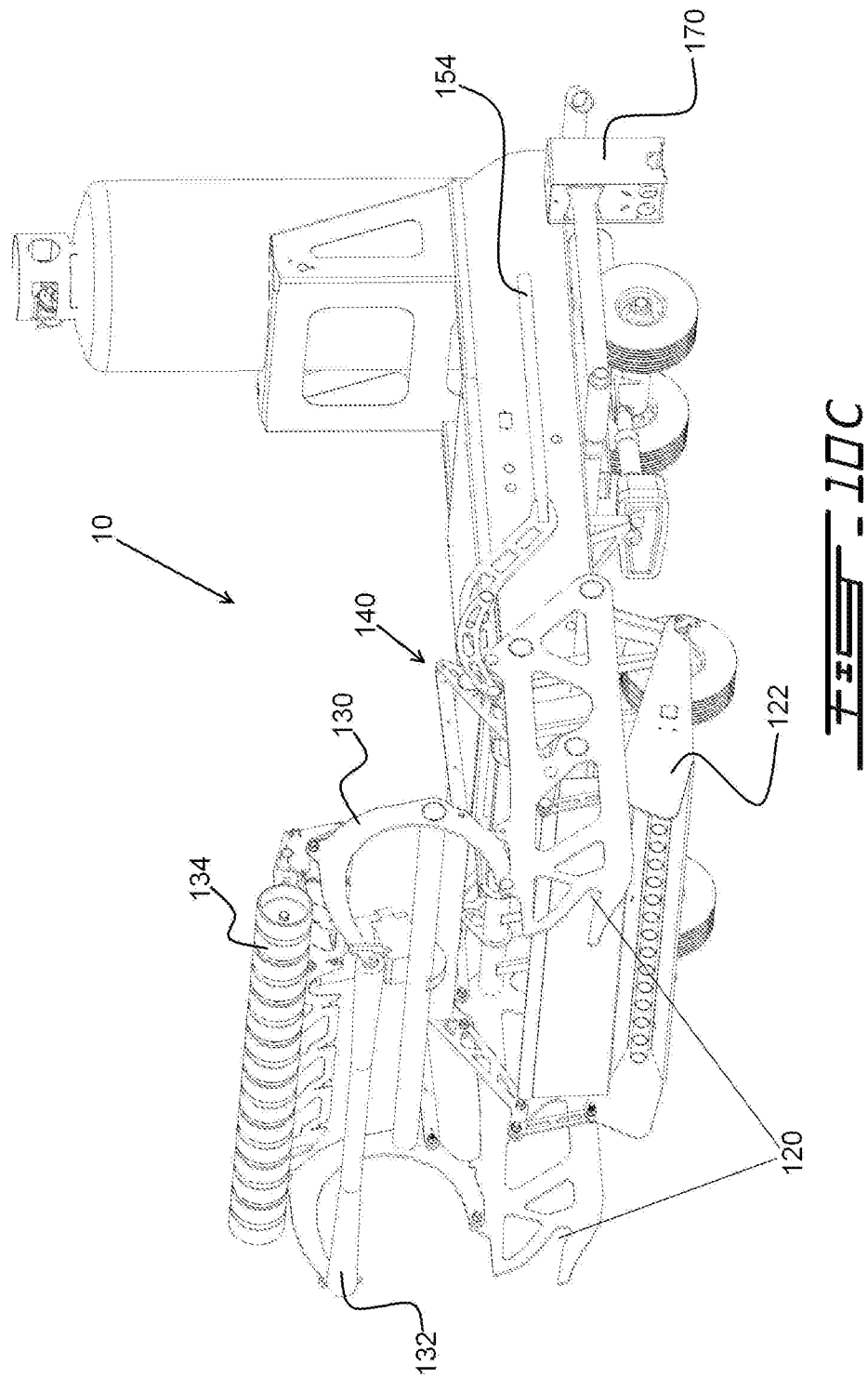

MEMBRANE APPLYING APPARATUS

CROSS-REFERENCE TO RELATED APPLICATIONS

The present patent application claims the benefits of priority of U.S. Provisional Patent Application No. 61/606,058, entitled "Membrane Applying Apparatus" and filed at the United States Patent and Trademark Office on Mar. 2, 2012; the content of which is incorporated herein by reference.

FIELD OF THE INVENTION

The present invention generally relates to apparatuses for applying rolls of membranes, and more particularly relates to apparatuses for applying rolls of elastomeric and/or bituminous membranes on roof structures.

BACKGROUND OF THE INVENTION

Bituminous roofing membranes are typically torch-applied. The roofer holds a torch in his hand and sweeps it across the underside of an unrolled length of bituminous membrane to cause the membrane to adhere to the underlying flat (or low pitch) roof decking surface. In addition to the torch welder, at least two other operators are typically needed to properly unroll and aligned the membranes in order to provide a uniform and constant longitudinal lap joints along the sides of adjacent laid down membranes.

This process is labour intensive and the quality of the membrane installation varies greatly according to the skills and the attention of the roofers. Also, this work is physically demanding and often results in injuries.

To overcome the shortcomings of manual application of bituminous membranes, several devices and apparatuses have been proposed.

For instance, in U.S. Pat. No. 7,347,244, a membrane applicator is disclosed in which the membrane is unrolled, heated and pressed as the applicator moves on the roof decking surface. Though the disclosed applicator significantly reduces human intervention in the application of bituminous membranes, its configuration makes it difficult to safely remove empty rolls of membrane and install new rolls. Due to the presence of several burners near the idler and pressing rollers, roofers often burn themselves during roll changes. In that sense, since a typical roll of membrane lasts only for a few minutes, roll changes occur relatively frequently, thereby increasing the risks of injuries.

Hence, despite recent developments in the field of apparatuses for applying membranes, there is a need for a membrane applying apparatus that will at least mitigate some of the shortcomings of prior apparatuses.

SUMMARY OF THE INVENTION

A membrane applying apparatus, in accordance with the principles of the present invention, generally mitigates at least some shortcomings of prior apparatuses by having the idler roller and the pressing roller mounted to a roller support frame pivotable between an operative position and an inoperative position.

The membrane applying apparatus is generally configured to hold, dispense and apply a membrane on a surface. Typically, the membrane is roofing membrane and comprises a top side and an adherent under side. The adherent under side is typically made of bituminous compounds though it could also be made of elastomeric materials.

The membrane applying apparatus generally comprises a wheeled frame having a front end, an intermediate region, and a rear end. The wheels of the apparatus generally comprise front motorized steerable wheels, located at the front end, which allow the apparatus to be steered as it moves on the roof decking surface, and rear support wheels, located at or near the rear end, which provide support for the rear end of the apparatus.

The front end is generally configured to removably receive a flammable gas cylinder or tank (e.g. a propane cylinder) fluidly connected to a series of burners located at the rear end of the wheeled frame. The burners are generally configured to heat the adherent under side of the membrane such that the under side softens enough to adhere on the roof decking surface during installation.

The intermediate region generally comprises a platform for allowing an operator to stand on the apparatus during the application of membrane if necessary. The standing operator may steer the apparatus and/or monitor the membrane application.

The rear end of the wheeled frame is configured to receive a roll of membrane in addition to supporting the series of burners. In that sense, the rear end typically comprises a pair of receiving slots configured to receive a support shaft on which the roll of membrane is mounted.

In typical yet non-limitative embodiments, the slots are open-ended and extend at a downward angle to prevent the shaft from accidentally exiting the slots.

The wheeled frame also comprises a roller support frame pivotally mounted at the rear end thereof. The roller support frame pivotally supports the idler roller and the pressing roller which are respectively configured to guide and press the membrane as it is unrolled, heated and applied on the roof decking surface.

In accordance with the principles of the present invention, the roller support frame is pivotable between an operative position and an inoperative position.

In the operative position, the roller support frame positions the idler roller and pressing roller such that they respectively guide and press the membrane. In the inoperative position, the roller support frame is pivoted substantially upwardly to provide access to the rear end of the wheeled frame where the roll of membrane is mounted.

Understandably, when the roller support frame is pivoted upwardly in its inoperative position, access to the rear end of the wheeled frame, and more particularly to the receiving slots, is easier, thereby easing the installation and removal of a roll of membrane on the apparatus.

In typical yet non-limitative embodiments, the roller support frame is substantially C-shaped such as at least partially circumscribe the roll of membrane when in the operative position.

In typical yet non-limitative embodiments, the roller support frame is further connected to the wheeled frame via articulated linkages. These linkages, via a series of levers, links and handles, generally reduce the force necessary to raise the roller support frame in its inoperative position and to lower the roller support frame in its operative position.

By allowing the roller support frame to be temporarily displaced in its inoperative position and thus by temporarily freeing the rear end of the wheeled frame, a new roll of membrane can be easily installed and an empty roll can be easily removed without the need for the operator to go near the burners, thereby reducing the risks of burner-related injuries.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which:

FIG. 4 is a side perspective view of the membrane applying apparatus of FIG. 1.

FIG. 5 is a bottom front perspective view of the membrane applying apparatus of FIG. 1.

FIG. 6 is a rear bottom perspective view of the membrane applying apparatus of FIG. 1.

FIG. 7 is a side view of the membrane applying apparatus of FIG. 1

FIG. 8 is an enlarged side view of the rear end portion of the membrane applying apparatus of FIG. 1.

FIG. 9 is a top view of the membrane applying apparatus of FIG. 1.

FIGS. 10A to 10C are sequential rear perspective views of the membrane applying apparatus of FIG. 1, without the roll of membrane, showing the pivotal movement of the roller support frame between the operative position (FIG. 10A) and the inoperative position (FIG. 10C).

DESCRIPTION OF AN EMBODIMENT OF THE INVENTION

A novel membrane applying apparatus will be described hereinafter. Although the invention is described in terms of specific illustrative embodiments, it is to be understood that the embodiments described herein are by way of example only and that the scope of the invention is not intended to be limited thereby.

Figure 1:
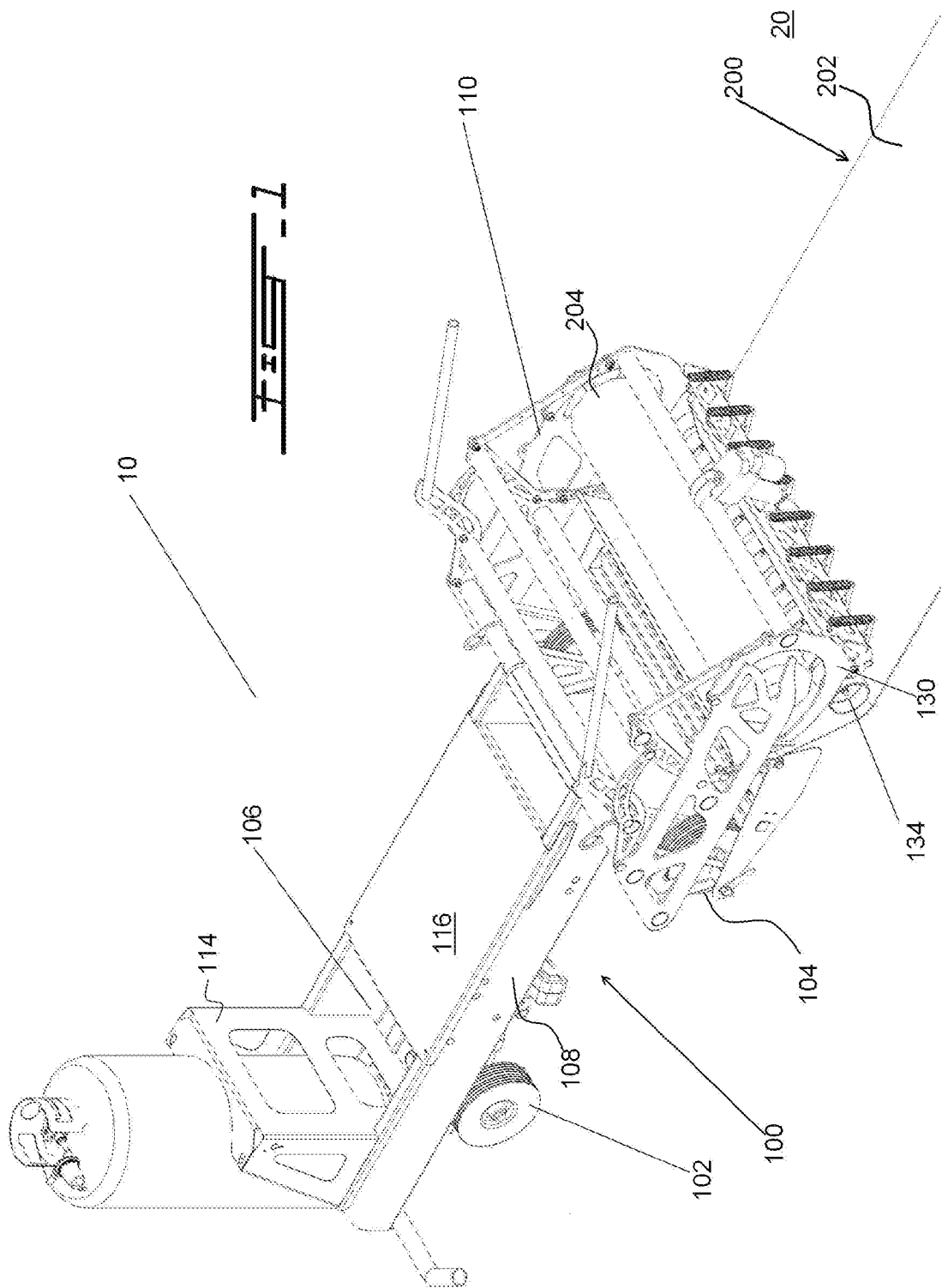
FIG. 1 is a rear perspective view of a membrane applying apparatus in accordance with the principles of the present invention, with a membrane roll and a propane tank mounted thereto.
Figure 2:
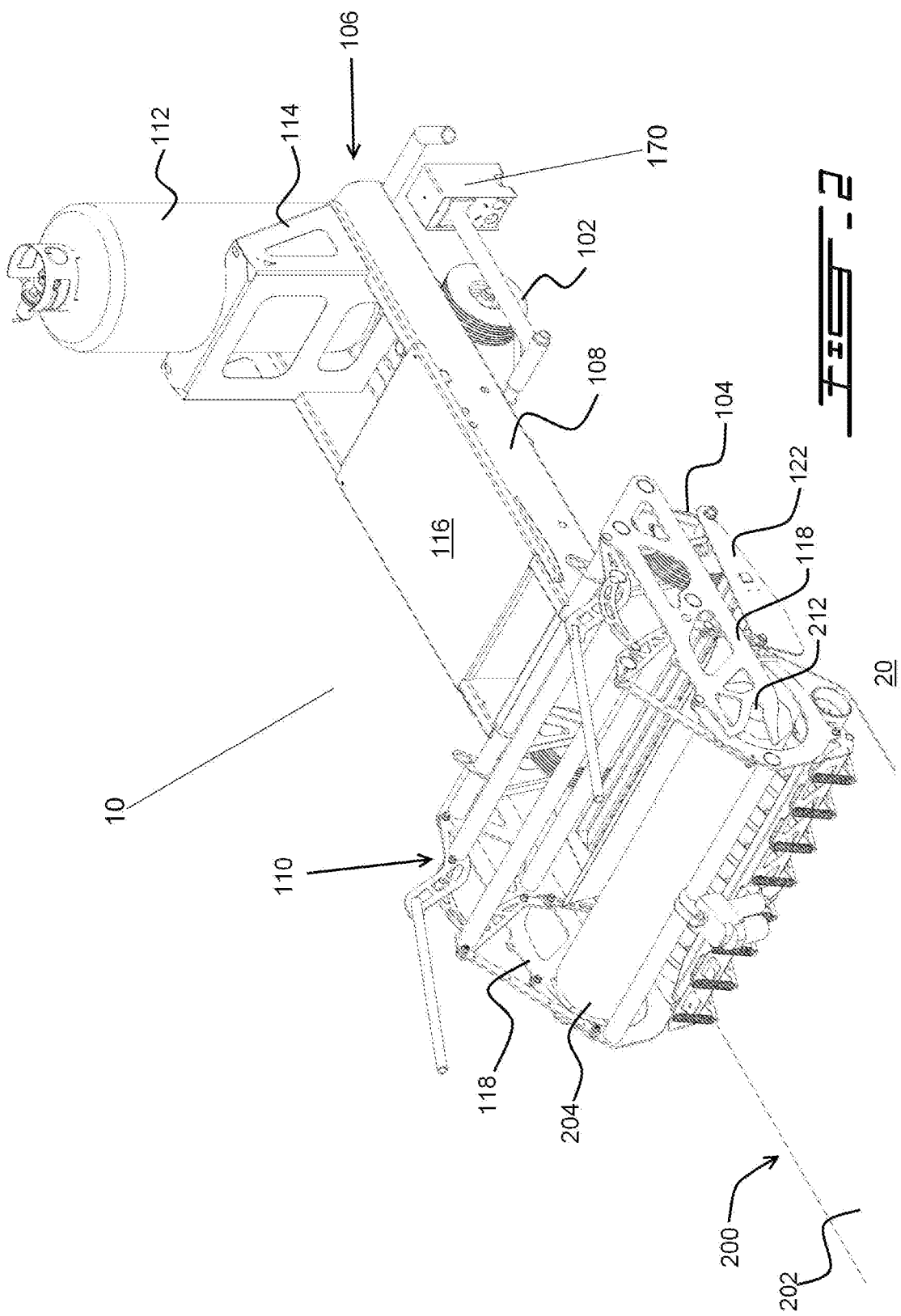
FIG. 2 is another rear perspective view of the membrane applying apparatus of FIG. 1.

Referring first to FIGS. 1 and 2, an embodiment of a membrane applying apparatus 10 in accordance with the principles of the present invention is shown. The apparatus 10 is generally configured to hold, dispense and apply a membrane 200 on a surface 20. Typically, the membrane 200 is a roofing membrane configured to be applied on a roof decking surface. Such roofing membrane 200 generally comprises a top side 202 and an adherent under side 204. The adherent under side 204 is typically made of bituminous compounds though it could also be made of elastomeric materials. As it will be best understood below, the adherent under side 204 is configured to be heated such as to soften enough to adhere on the surface 20.

Referring now more generally to FIGS. 1 to 5, in the present embodiment, the membrane applying apparatus 10 generally comprises a longitudinally extending wheeled frame 100 having front steerable and motorized wheels 102, typically located near or at the front end 106, and rear supporting wheels 104, typically located near or at the rear end 110. The wheeled frame 100 also comprises a middle or intermediate region 108 extending between the front end 106 and the rear end 110.

In the present embodiment, the rear wheels 104 are located within the width of the wheeled frame 100 of the apparatus 10, thereby allowing the apparatus to apply membrane 200 close to walls and other obstacles (see FIG. 9).

Figure 3:
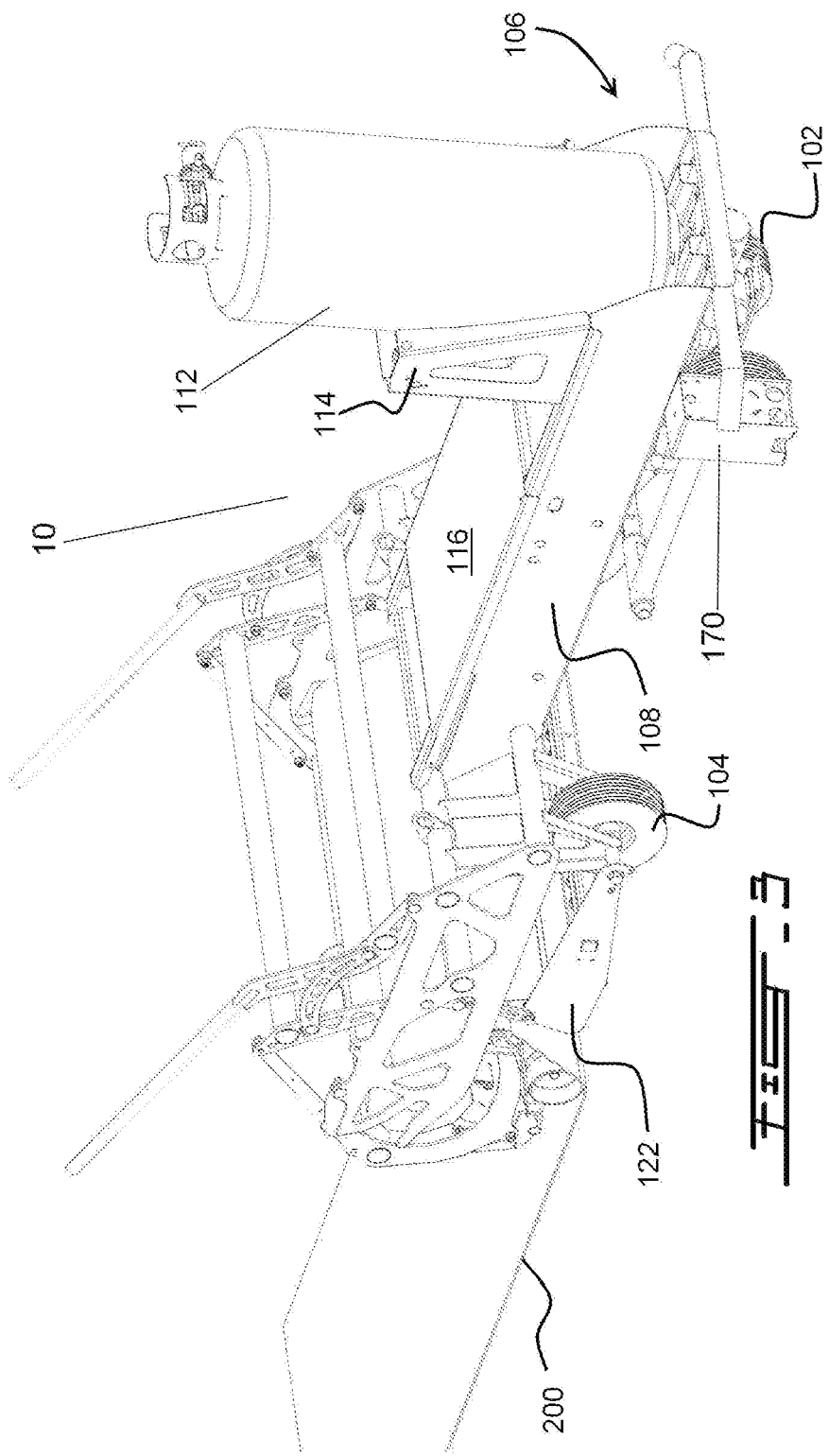
FIG. 3 is a front perspective view of the membrane applying apparatus of FIG. 1.

The front end 106 is generally configured to removably receive and/or secure a flammable gas cylinder 112 (e.g. a propane cylinder). This gas cylinder 112 is in fluid communication with a burner assembly 122 located at the rear end 110 (see FIG. 6). To properly receive and hold the cylinder 112, the front end 106 generally comprises a holding frame 114 shaped to at least partially embrace the cylinder 112 as best shown in FIGS. 1 to 3. Though not shown in the figures, the holding frame 114 can be provided with adjustable straps to properly secure the cylinder 112 in place.

In the present embodiment, the middle region 108 generally comprises a platform 116 allowing an operator to stand on the apparatus 10 during the application of membrane 200. This standing operator can steer and/or otherwise monitor the application of the membrane 200.

For its part, the rear end 110 is configured to receive the roll 210 of membrane 200 in addition to supporting the burner assembly 122 already introduced above.

To support the roll 210 of membrane 200, the rear end 110 comprises two laterally spaced supporting members 118, one on the left, one on the right. Each supporting member 118 comprises an open-ended receiving slot 120 configured to receive a support shaft 212 on which the roll 210 of membrane 200 is mounted. As best shown in FIG. 7, in the present embodiment, the receiving slots 120 extend downwardly at an angle, thus generally preventing the shaft 212 from accidentally exiting the slots 120.

Referring now to FIGS. 6 to 8, the burner assembly 122 is shown in greater detail. In the present embodiment, the burner assembly 122 comprises a plurality of burners 124 laterally aligned to cover the full width the membrane 200 to be applied. Understandably, these burners 124 are configured to heat the adherent under side 204 of the membrane 200 such that the under side 204 softens enough to adhere on the roof decking surface 20 during application. As mentioned above, the burners 124 are fluidly connected to the gas cylinder 112 such as to be fed with gas. Understandably, the amount of gas fed to each of the burners 124 can be controlled with one or more valves in manner known in the art.

As it will be best understood below, the burner assembly 122 is pivotally mounted to the rear end 110 of the wheeled frame 100, typically near the rear supporting wheels 104, and to the articulated linkages 140. Such pivotal connections allow the burner assembly 122 to be slightly lowered and raised with the roller support frame 130 about to be described.

Now referring to FIGS. 6 to 8, the wheeled frame 100 comprises a roller support frame 130 pivotally mounted thereto. The roller support frame 130 pivotally supports at least one idler roller 132 and at least one pressing roller 134. As best shown in FIG. 7, the idler roller 132 redirects the unwound membrane 200 such that its under side 204 passes near the burners 124 to cause the adherent under side 204 to be heated by the flames of the burners 124 and thus become soft enough to adhere on the roof decking surface 20. Typically, the burner assembly 122 heats the membrane 200 in-between its passages between the idler roller 132 and the pressing roller 134. For its part, the pressing roller 134 presses the membrane 200 onto the roof decking surface 20.

Understandably, to properly press the membrane 200 onto the surface 20, the pressing roller 134 is typically made of heavy metallic materials such as steel.

In the present embodiment, the pressing roller 134 is pivotally mounted at one extremity 135 of a first pivoting rocking arm 136 which other extremity 137 is connected to a second pivoting rocking arm 162 with a spring 138. The spring-loaded rocking arm 136 allows the pressing roller 134 to substantially follow to imperfections of the roof decking surface 20 without causing the whole support frame 130 to move.

For its part, the second pivoting rocking arm 162 is pivotally mounted to the roller support frame 130 and is connected to an actuator 180 (e.g. an electric actuator) mounted to the roller support frame 130. The actuator 180 is configured to either push or pull the second rocking arm 162 such as to cause the pressing roller 134 to be in and out of engagement with the membrane 200. In that sense, in the present embodiment, the actuator 180 generally automatically actuates the second rocking arm 162 to put the pressing roller 134 out of engagement when the membrane roll 210 is depleted.

In accordance with the principles of the present invention, the roller support frame 130 is pivotable between an operative position and an inoperative position.

In the operative position, the roller support frame 130 positions the idler roller 132 and the pressing roller 134 such that they respectively guide and press the membrane 200 on the roof decking surface 20 as shown in FIGS. 1 to 8 (see particularly FIGS. 7 and 8).

In the inoperative position, the roller support frame 130 is pivoted substantially upwardly to provide access to the rear end 110 of the wheeled frame 100 where the roll 210 of membrane 200 is mounted in the slots 120 (see FIG. 10C).

Understandably, when the roller support frame 130 is pivoted upwardly in its inoperative position, access to the rear end 110 of the wheeled frame 100, and more particularly to the receiving slots 120, is easier, thereby easing the installation and removal of a roll 210 of membrane 200 in the apparatus 10. Notably, the installation and/or removal of a roll 210 of membrane 200 when the roller support frame 130 is in the inoperative position may substantially reduce the number of incidents or injuries to an operator as it allows the operator to install/remove the roll 210 of membrane 200 at a safe distance from the heat of the burners 124, as shown in FIG. 10C.

In the present embodiment, the roller support frame 130 is pivoted using a series of articulated linkages 140.

As best shown in FIG. 8, the articulated linkages 140 comprise first members 142 (one on the left side, one on the right side), second members 144, third members 146, and fourth members 148. Since the left and right members are symmetric, only the left members will be described below.

The first member 142 is pivotally mounted, at one extremity 150, to the supporting member 118, and comprises, at its other extremity 152, a handle 154. As it will be shown in more details below, the handle 154 is configured to be grasped by an operator to pivot the first member 142 and to cause the rotation of the roller support frame 130 from its operative position to its inoperative position, and vice-versa. As best shown in FIG. 8, the first member 142 is arcuate.

The second member 144, which is also arcuate, interconnects the first member 142 and the third member 146. In that sense, the second member 144 is pivotally connected to the first member 142, in a middle region 156 thereof, and to the third member 146, near its upper extremity 158.

For its part, the third member 146 is pivotally mounted, near its lower extremity 160, to the supporting member 118.

The third member 146 is also pivotally connected to both the fourth member 148 and to the burner assembly 122 via a small linking member 161.

Finally, the fourth member 148 provides the final link between the third member 146 and the roller support frame 130. In that sense, the fourth member is pivotally connected to both the third member 146 and to the roller support frame 130.

Referring now to FIGS. 10A to 10C, it will be shown how the articulated linkages 140 cause the upward pivotal movement of the roller support frame 130 between its operative position (see FIG. 10A) and its inoperative position (see FIG. 10C).

As the handles 154 are pivoted toward the front end 106 of the apparatus 10, they pull on the articulated linkages 140 which pull on the roller support frame 130 to cause its upward pivotal movement.

Once the roller support frame 130 is fully pivoted in its inoperative position (see FIG. 10C), the rear end 110 of the wheeled frame 100, and more particularly the slots 120, become fully accessible. With the roller support frame 130 out of the way, it becomes easier to install a new roll 210 of membrane 200 or to remove an empty roll 210 of membrane 200 without having to go near the burner assembly 122.

Notably, as mentioned above, the third members 146 are connected to the burner assembly 122 via the linking members 161. This connection allows the burner assembly 122 to be slightly pivoted upwardly when the roller support frame 130 is pivoted to its inoperative position. Understandably, while the roller support frame 130 is in its inoperative position, it is preferable that burners 124 are not directed toward the ground to avoid damaging the already laid-down membrane 200.

To pivot the roller support frame 130 back to its operative position, the handles 154 are rotated back toward the rear end 110 of the apparatus 10.

Notably, in the present embodiment, the roller support frame 130 is substantially C-shaped, allowing it to at least partially circumscribe the roll 210 of membrane 200 when in the operative position. This C-shaped configuration also allows the proper positioning of the idler roller 132 and pressing roller 134.

Though several different configurations of articulated linkages 140 could be used, the configuration shown in the present embodiment typically reduces the force necessary to raise the roller support frame 130 in its inoperative position and to lower the roller support frame 130 in its operative position.

Though not shown in the figures, in the present embodiment, the apparatus 10 may also comprises at least one tensioner which is biased against the roll 210 of membrane 200 to maintain a relatively constant tension in the membrane 200 as it is unwound, heated and applied. It is to be understood that membrane rolls 210 are not always cylindrical. The at least one tensioner thus compensates for the sometime uneven unwinding of the membrane roll 210 during operation of the apparatus 10.

Now referring back to FIG. 2, the apparatus 10 may comprise an alignment sensor 170 attached to the wheeled frame 100. The alignment sensor 170 may be used to assist the operators to apply membranes such that adjacent laid down membranes form uniform and constant longitudinal lap joints along their sides.

In some embodiments, the sensor 170 may be connected to a controller which is also connected to the steering mechanism of the front wheels 102 to automatically adjust the direction of the front wheels 102.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for applying a membrane to a substantially flat surface, the membrane having a top side and an adherent under side; the apparatus comprising:
    a) a wheeled frame adapted to ride on the surface to be covered with the membrane, the wheeled frame comprising a front end and a rear end, the rear end being configured to receive a roll of membrane;
    b) a roller support frame pivotally mounted to the wheeled frame at the rear end thereof, wherein the roller support frame at least partially circumscribes the roll of membrane, the roller support frame pivotally supporting at least one idler roller and at least one pressing roller, the at least one idler roller and the at least one pressing roller being respectively configured to guide and press the membrane as it is unrolled and applied, the roller support frame being pivotable between an operative position and an inoperative position;
    c) at least one heat source mounted to the rear end of the wheeled frame and configured to heat the under side of the membrane between the at least one idle roller and the at least one pressing roller.

2. An apparatus as claimed in claim 1, wherein when the roller support frame is in the operative position, the at least one idler roller and the at least one pressing roller respectively guide and press the membrane.

3. An apparatus as claimed in claim 1, wherein when the roller support frame is in the inoperative position, the roller support frame is pivoted substantially upwardly such as to allow access to the rear end of the wheeled frame.

4. An apparatus as claimed in claim 1, wherein the roller support frame is further connected to the wheeled frame via articulated linkages.

5. An apparatus as claimed in claim 1, wherein the front end is generally configured to removably receive a flammable gas cylinder fluidly connected to the heat source.

6. An apparatus as claimed in claim 1, wherein the wheeled frame comprises an intermediate region comprising a platform.

7. An apparatus as claimed in claim 1, wherein the rear end of the wheeled frame comprises two laterally spaced supporting members configured to support the roll of membrane.

8. An apparatus as claimed in claim 7, wherein the two laterally spaced supporting members comprise an open-ended receiving slot configured to receive a support shaft on which the roll of membrane is mounted.

9. An apparatus as claimed in claim 8, wherein the receiving slots extend downwardly at an angle.

10. An apparatus as claimed in claim 1, wherein the apparatus comprises at least one tensioner which is biased against the roll of membrane to maintain a relatively constant tension in the membrane as it is unwound, heated and applied.

11. An apparatus as claimed in claim 1, wherein the roller support frame is substantially C-shaped.

12. An apparatus as claimed in claim 1, wherein an alignment sensor is attached to the wheeled frame.

13. An apparatus as claimed in claim 12, wherein the front end of the wheeled frame comprises wheels and a steering mechanism, and wherein the alignment sensor is connected to a controller also connected to the steering mechanism to automatically adjust the direction of the front wheels.

14. An apparatus for applying a membrane to a substantially flat surface, the membrane having a top side and an adherent under side; the apparatus comprising:
    a) a wheeled frame adapted to ride on the surface to be covered with the membrane, the wheeled frame comprising a front end and a rear end, the rear end being configured to receive a roll of membrane;
    b) a roller support frame pivotally mounted to the wheeled frame at the rear end thereof, the roller support frame pivotally supporting at least one idler roller and at least one pressing roller, wherein the at least one pressing roller is pivotally mounted to the roller support frame, the at least one idler roller and the at least one pressing roller being respectively configured to guide and press the membrane as it is unrolled and applied, the roller support frame being pivotable between an operative position and an inoperative position;
    c) at least one heat source mounted to the rear end of the wheeled frame and configured to heat the under side of the membrane between the at least one idle roller and the at least one pressing roller.

15. An apparatus as claimed in claim 14, wherein when the roller support frame is in the operative position, the at least one idler roller and the at least one pressing roller respectively guide and press the membrane.

16. An apparatus as claimed in claim 14, wherein when the roller support frame is in the inoperative position, the roller support frame is pivoted substantially upwardly such as to allow access to the rear end of the wheeled frame.

17. An apparatus as claimed in claim 14, wherein the roller support frame is further connected to the wheeled frame via articulated linkages.

18. An apparatus as claimed in claim 14, wherein the front end is generally configured to removably receive a flammable gas cylinder fluidly connected to the heat source.

19. An apparatus as claimed in claim 14, wherein the wheeled frame comprises an intermediate region comprising a platform.

20. An apparatus as claimed in claim 14, wherein the rear end of the wheeled frame comprises two laterally spaced supporting members configured to support the roll of membrane.

* * * * *